United States Patent [19]

Bates

[11] 4,145,607
[45] Mar. 20, 1979

[54] SYSTEM AND METHOD FOR SHAPING PULSES OF OPTICAL RADIATION

[76] Inventor: Harry Bates, 635 Darcey Dr., Winter Park, Fla. 32792

[21] Appl. No.: 751,154

[22] Filed: Dec. 16, 1976

[51] Int. Cl.² .............................................. H04B 9/00
[52] U.S. Cl. ................................................... 250/199
[58] Field of Search ....................... 250/199; 332/7.51

[56] References Cited

U.S. PATENT DOCUMENTS

| | | | |
|---|---|---|---|
| 3,654,473 | 4/1972 | Nussmeier | 250/199 |
| 3,752,992 | 8/1973 | Fluhr | 250/199 |

*Primary Examiner*—Richard Murray
*Attorney, Agent, or Firm*—Duckworth, Hobby, Allen & Pettis

[57] ABSTRACT

A system for shaping pulses of optical radiation includes a birefringent element for receiving a polarized pulse from a source of optical radiation and projecting the pulse into two orthogonally polarized beams. The birefringent element is designed to introduce a phase shift between the two beams during transmission therethrough, such that when the two beams are recombined at the output of the birefringent element, the shape of the pulse is modified with respect to the input pulse.

22 Claims, 11 Drawing Figures

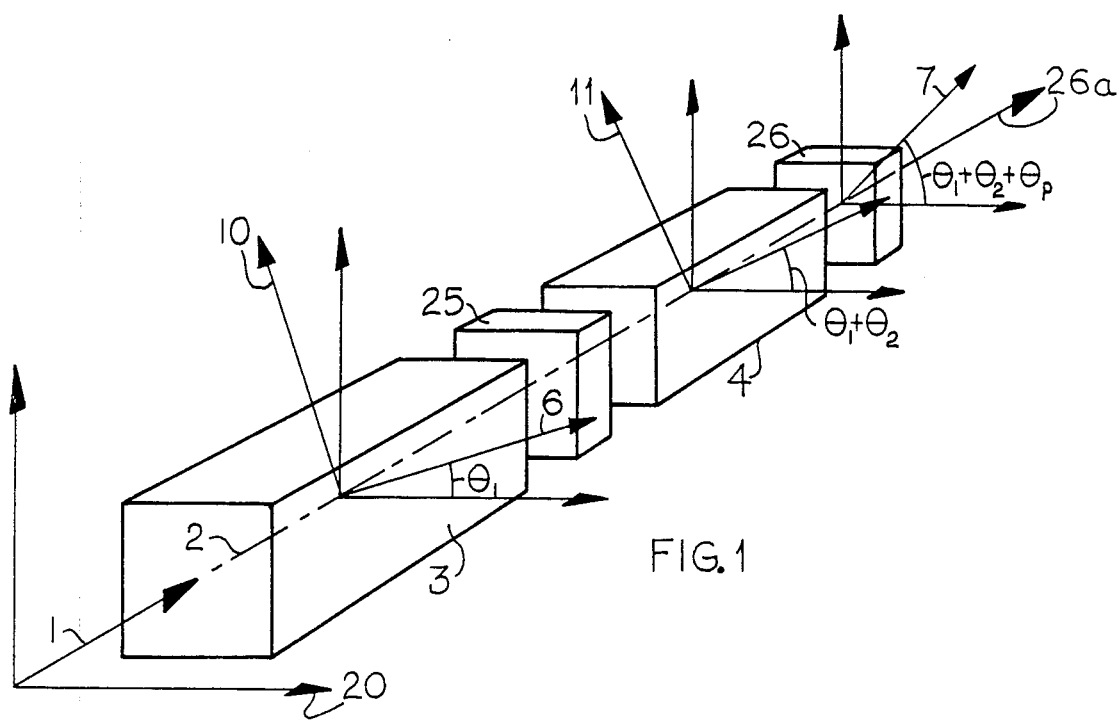
FIG. 1
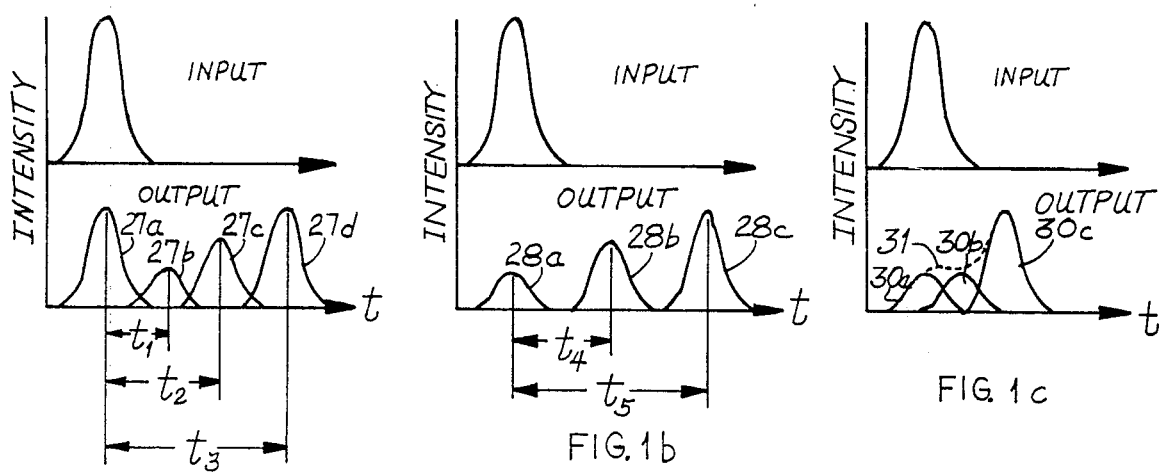
FIG. 1a
FIG. 1b
FIG. 1c
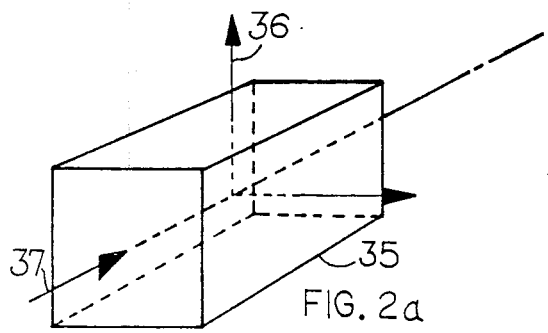
FIG. 2a
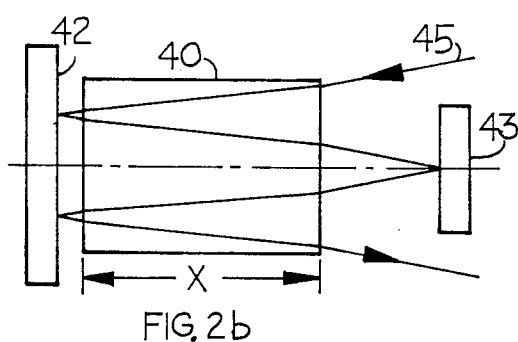
FIG. 2b

SYSTEM AND METHOD FOR SHAPING PULSES OF OPTICAL RADIATION

BACKGROUND OF THE INVENTION

1. Field of the Invention

This invention generally relates to devices for the shaping of short pulses of optical radiation. Specifically, the present invention concerns an arrangement of optical elements which passively shape the time profile of a pulse or pulses of optical radiation.

The shaping of pulses of optical radiation such as those emitted from a mode locked laser is useful for many purposes. One specific application is in the systems for laser induced thermonuclear fusion (inertial confinement) in which an amplified pulse of laser light is caused to impinge on a small pellet of suitable material thus compressing and heating said material and causing a significant amount of nuclear energy to be released. Depending on the design of the pellet, the incident laser pulse triggering the fusion reaction must be shaped in time in order to achieve optimum release of energy.

It will be readily understood by those skilled in the art, in view of the following detailed disclosure, that these methods and techniques for shaping optical pulses are suited for employment in a great many different applications including modulation of mode locked laser pulse trains. It is also to be understood that this invention is not to be limited in its manner of employment and that many specific uses are contemplated although, for purposes of brevity, not enumerated separately in detail.

2. Description of Prior Art

There are a number of methods known for the generation of various intensity vs. time profiles starting with a given optial pulse. These include both active and passive techniques. A number of active techniques utilize Pockel's cells and other modulators to change the temporal shape of an optical pulse. For example, see U.S. Pat. No. 3,521,192. Etalons and beam splitters both separately and in various combinations have been considered for use as passive pulse shapers. Examples of such arrangements are disclosed in U.S. Pat. No. 3,879,109. Nonlinear dye systems have also been considered. The nonlinear techniques can result in considerable transverse beam distortion which for some systems results in considerable energy loss when spacial filtering is done to eliminate the distortion. Other problems with existing techniques include inflexibility of the design, i.e., a single design can only yield a given pulse shape or very limited range of pulse shapes without radical system changes. Multiple beam splitter-recombiner systems, like that disclosed in U.S. Pat. No. 3,521,192, suffer problems of beam alignment and transmission losses. See also U.S. Pat. Nos. 3,435,226 and 3,430,048.

Thus a need exists for a technique and apparatus for generating optical pulses of various shapes with good transmission characteristics, ease of alignment, and flexibility.

SUMMARY OF THE INVENTION

The system disclosed in the following discussion can generate many different pulse shapes using a single design and without major changes. In addition, the interaction between the radiation field and the device is linear and transverse beam distortion is minimized.

A system in accordance with the present invention provides a means for shaping pulses of optical radiation and includes means for polarizing the radiation should it not already be polarized and means for dividing the resulting polarized beam into a multiplicity of polarized states either serially or in parallel or in some combination of serial and parallel elements such that each element possesses the property of projecting the polarized component of the beam incident on it into two orthogonally polarized states. The system also includes means for generating phase retardation between the orthogonally polarized components and means for projecting said single beam into a single polarized state.

Briefly, the objects of the invention are achieved according to the teachings of the present invention by polarizing the incident pulse of electromagnetic radiation to be shaped in time, causing that pulse to pass through a series of elements each of which first divide the incident radiation field into two orthogonally polarized independently propagating components and then introducing a phase shift between these components, and finally projecting the resulting radiation field into a specific state of polarization. Any number of these stages can be utilized in series or in parallel together with suitable beam splitting means and a final beam recombining means (should the beams be split) to constitute a given pulse shaper design. As will become apparent to one skilled in the art after reading the detailed description below, any desired pulse shape can be produced using a specific embodiment of this invention providing the desired pulse shape has spectral components included and available in the incident pulse. It is to be understod that this invention includes specific embodiments which have no beam splitters between stages and all stages function in sequence as well as embodiments constituting more complicated systems where stages operate in series/parallel combinations and beam splitters and recombiners are required.

Other advantages and novel features of the invention will become apparent when considered in conjunction with the accompanying drawings wherein:

BRIEF DESCRIPTION OF THE DRAWINGS

FIG. 1 shows a specific illustrative pulse shaping arrangement utilizing two birefringent elements in series.

FIG. 1a shows an example of the waveforms obtained when the arrangement of FIG. 1 is operated in the nondegenerate mode.

FIG. 1b shows an example of the waveforms obtained when the arrangement of FIG. 1 is operated in the degenerate mode.

FIG. 1c shows how output pulses from a pulse shaping device can be combined to form a single shaped pulse.

FIG. 2a shows an example of a birefringent element consisting of a uniaxial crystal.

FIG. 2b shows how mirrors can be used to increase the optical path length through a uniaxial crystal.

DESCRIPTION OF THE PREFERRED EMBODIMENT

Figure 3:
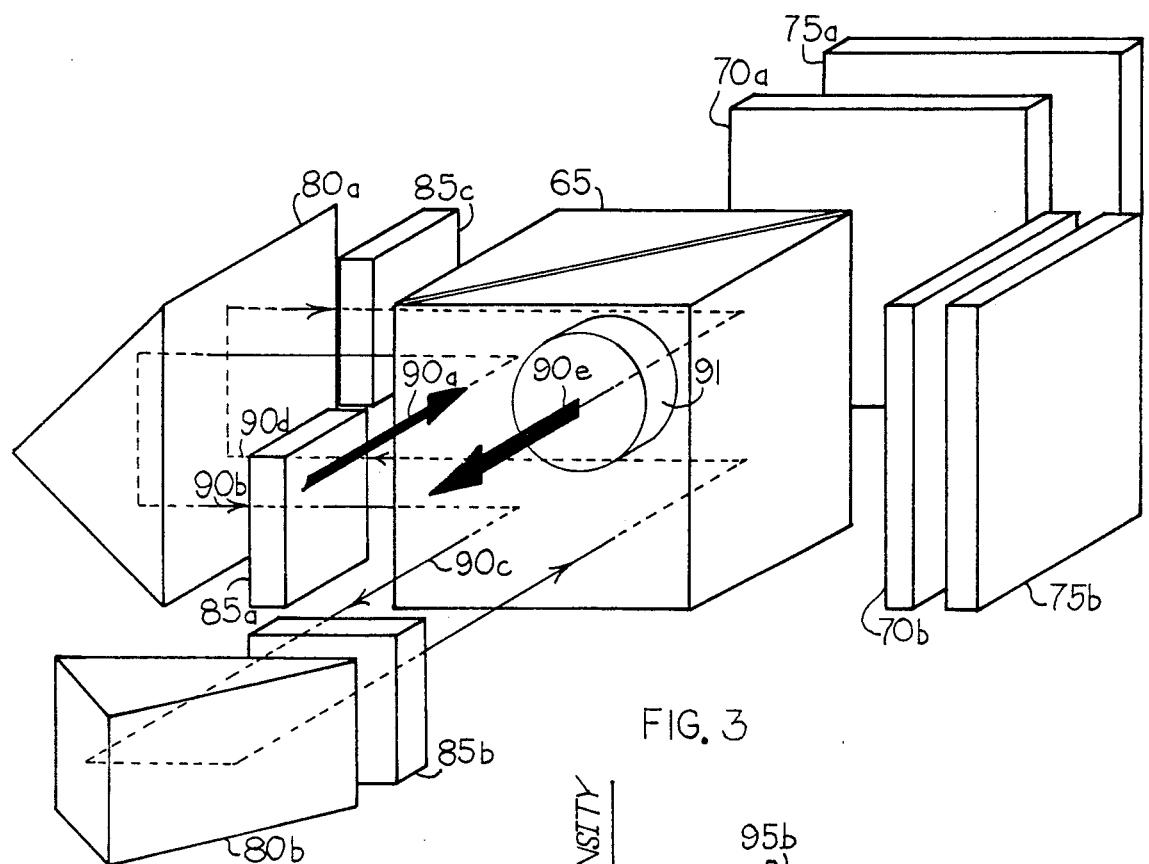
FIG. 3 shows an embodiment of the invention which is a four stage degenerate pulse shaper consisting of one polarizing beam splitter, two mirrors, and other optical elements.

A discussion of the theoretical concepts associated with the present invention is given as a prerequisite to a description of the function of the present invention.

An incident pulse of electromagnetic radiation to be shaped can be described at a point in terms of plane waves each of the form, $$\begin{pmatrix} E(t) \\ 0 \end{pmatrix} = \begin{pmatrix} f(t)e^{i\omega t} \\ 0 \end{pmatrix} \quad 1.$$

where t is time; E(t) is the complex electric field; $\omega$ is the center frequency of the pulse of radiation and f(t) is the complex envelope or amplitude function describing the shape of the envelope of the sinusodial function which is in general more slowly varying than $e^{i\omega t}$. The electric field at any given time is obtained by taking the real part of (1). Also, the column vector is used to denote two possible transversely polarized states of the radiation field. In this discussion the following convention is used: The top element of the vector is the polarization direction related to (a) the direction of the polarizing element of the previous stage; (b) input polarization vector of light entering the system; or (c) the direction of the slow axis of the previous stage if no polarizer is used at the output of that stage. Thus, it should be clear that the direction of the basis vectors describing the polarization of the radiation field at any given point in the system will in general be rotated in some direction in a plane perpendicular to the axis of propagation when the radiation field propagates through each stage.

At this point, the notation of (1) will be shortened to, $$\text{Input radiation field} = \begin{pmatrix} f_0(t) \\ 0 \end{pmatrix} \quad 2.$$

In general at some arbitrary point in the system this will be:

$$\text{Radiation field at } i = \begin{pmatrix} f_{1i}(t) \\ f_{2i}(t) \end{pmatrix} \quad 3.$$

The action of a general stage of the system can be described by a matrix operator $M_i$, where i denotes the $i^{th}$ stage:

$$\underline{\underline{M}}_i \begin{pmatrix} f_{1i-1}(t) \\ f_{2i-1}(t) \end{pmatrix} = \begin{pmatrix} f_{1i}(t) \\ f_{2i}(t) \end{pmatrix} \quad 4.$$

The matrix for a stage containing no output polarizer is given by:

$$\underline{\underline{M}}_i = \begin{pmatrix} e^{i\delta_i}\cos\theta & e^{i\delta_i}\sin\theta_i \\ -\sin\theta_i & \cos\theta_i \end{pmatrix} \quad 5.$$

If the stage includes a polarizer having its transmission axis oriented at an angle $\theta_{pi}$ with respect to the slow axis of the previous part of the stage, then the matrix for this kind of $i^{th}$ stage will be given by the product of two matrices:

$$\underline{\underline{M}}_i = \begin{pmatrix} \cos\theta_{pi} & \sin\theta_{pi} \\ 0 & 0 \end{pmatrix} \begin{pmatrix} e^{i\delta_i}\cos\theta_i & e^{i\delta_i}\sin\theta_i \\ -\sin\theta_i & \cos\theta_i \end{pmatrix} \quad 6.$$

using the Jones calculus formalism, where $\delta_i$ is the phase shift introduced by the $i^{th}$ stage. It is understood that:

$$7.\ e^{i\delta_i}f(t) = e^{i\phi_i}f(t-\tau_i)$$

where $$8.\ \delta_i = \phi_i + 2\pi m_i \quad m_i = 1,2,3...$$

$$\tau_i = \frac{2\pi m_i}{\omega} \quad 9.$$

and where $\phi_i$ is the principle value of $\delta_i$.

For a given input pulse shape $f_o(t)$ and a given system of N stages, there will be an output pulse shape defined by:

$$\begin{pmatrix} h_0(t) \\ 0 \end{pmatrix} = \underline{\underline{M}}_n \underline{\underline{M}}_{n-1} \ldots M_1 \begin{pmatrix} f_0(t) \\ 0 \end{pmatrix} \quad 10.$$

where $h_0(t)$ will be the resultant amplitude distribution and will have the form:

$$h_0(t) = \sum_{k=1}^{n} c_k e^{i\phi_k} f(t-\tau_k) \quad 11.$$

which describes the output amplitude function as a complex sum of terms each having the form f(t) of the input pulse amplitude but shifted in time by various amounts $\tau_k$ and having weighting factors $c_k$ and complx phases $\phi_k$ all of which are in general functions of the parameters of the $M_i$ matrices. These pulses can either overlap in places or not. Wherever they do overlap, they will add as complex amplitudes and either constructively or destructively interfere to some degree. The degree of interference in these overlap regions will be determined by the relative phases of the waves at these points. It will be clear to one skilled in the art that the passive pulse shaping effect described can produce pulses of various shapes that are in general stretched in time but not shortened. It should also be clear that many different assemblies of stages can be constructed, all based on the principles discussed.

In order to illustrate the procedure needed to analyze parallel arrangements the example of two parallel stages will be considered. The input beam is assumed to be split into two parallel beams having temporal amplitudes $f_{10}(t)$ and $f_{20}(t)$. From (11) it is clear that the recombined output of such a parallel system will be generally expressed as $$h_T(t) = \sum_{m=1}^{n_1} C_m^1 e^{i\phi_m^1} f_{10}(t-\tau_m^1) + \sum_{k=1}^{n_2} C_k^2 e^{i\phi_k^2} f_{20}(t-\tau_k^2-\Delta T) \quad 12.$$

where $C_m^1$ and $C_k^2$ are the coefficients describing the resulting amplitude distribution of each parallel stage and $\phi_m^1$ and $\phi_k^2$ describes the phases associated with respective components. $\pi_m^1$ and $\pi_k^2$ describe the temporal phase shifts in the two systems and $\Delta T$ describes the temporal phase shift introduced between the outputs of the two parallel systems due to optical path length differences in the two optical paths. For the sake of completeness, two different embodiments are considered; One consisting of a chain of stages in series and one which utilizes two different series chains each working in parallel with the other.

Referring to FIG. 1, the system includes two birefringent elements 3 and 4 (such as birefringent crystals, for example), an optically active element 25 (described below) and a polarizer 26. All of the elements 3, 4, 25 and 26 are disposed along a common optical axis. An input pulse beam 1 of optical radiation, presumed to be polarized, is made parallel to the system beam axis 2 so that it will passthrough the two birefringent stages 3 and 4. Each stage is oriented in such a manner that the orthogonal slow axes 6 and 7 and fast axes 10 and 11, respectively, have a definite angular relationship with each other and the direction of polarization 20 of the input beam 1.

The angle $\theta_1$ defines the orientation of the slow axis 6 of the first stage with respect to the input polarization direction 20. The angle $\theta_2$ defines the orientation of the slow axis of stage 4 with respect to the slow axis of stage 3. Thus, the orientation of the slow axis of stage 4 with respect to the input polarization direction 20 would be $\theta_1 + \theta_2$. The angle of the transmission polarization axis 26a of the output polarizer 26, measured with respect to the slow axis 7 of the second stage 4, is $\theta_p$. Thus, the polarization axis 26a of the output polarizer 26, measured with respect to the input polarization direction 20, should be $\theta_p + \theta_1 + \theta_2$. All of these above mentioned angles are due to mechanical relationships between the stages 3 and 4 or the combined effect of mechanical and optical rotation caused by the optically active element 25.

Each stage 3 and 4 generates a temporal delay $\delta_i$ between components of the radiation field polarized parallel and perpendicular to the fast axis 10 or 11 of each stage 3 or 4, respectively. The optically active element 25 serves to rotate the plane of polarization of light passing through it and thus can effectively alter the relative angular orientation between the stages 3 and 4. In one embodiment, this element 25 may be made of an optically active solid, liquid or gas of a given thickness and specific rotation; or alternatively, may be made of a Faraday rotator such that the effective angular orientation between the stages 3 and 4 can be changed by varying the solenoid current and thus the applied magnetic field and the degree of Faraday rotation. Further the element 25 can switch the plane of polarization between two states as in the case of a pockels cell. Further the element 25 can be a halfwave plate oriented at a specific angle so as to rotate the plane of polarization of the light between stages. In addition, the element 25 may be electronically controlled in a known manner to modulate the beam.

It will be understood that, in some embodiments, the element 25 would not be required. It is included here in order to illustrate the principle of its use. The output polarizer 26 projects components of the radiation field from the two orthogonal propagating modes of the second stage 4. In the most general configuration of the two stage pulse shaper in accordance with this invention, the temporal delay introduced by the first and second stages 3 and 4 would be $\tau_1$ and $\tau_2$ with $\tau_1 \neq \tau_2$, and may be termed the nondegenerate case. FIG. 1a illustrates the temporal nature of the input and output amplitude distributions when $\tau_1$ and $\tau_2$ are both significantly larger than the pulse width of the input pulse. Here, there is a distribution of output pulses 27a thru 27d spaced in time relative to the input pulse $t_1 + \tau_1$, $t_2 = \tau_2$, and $t_3 = \tau_1 + \tau_2$ where $\tau_2 > \tau_1$. An equal spacing in time $\Delta t = \tau_1$ will occur if, for example, $\tau_2 = 2\tau_1$; then: $t_1 = \tau_1$, $t_2 = 2\tau_1$, $t_3 = 3\tau_1$, $t_2 - t_1 = \tau_1$, $t_3 - t_2 = \tau_1$. The degenerate case occurs when there is an exact overlap between pulses to form the resulting output distribution. This case is illustrated by FIG. 1b where $\tau_1 = \tau_2$ and $t_4 = \tau_1$, $t_5 = 2\tau_1$. The pulse amplitude 28b is composed of the complex vector sum of two parts, one part was the equivalent of 27b and the other the equivalent of 27c of the nondegenerate case. The distribution of pulse intensities relative to the input in both of the above cases can be determined from the section on theory.

The matrix operator describing the two stage system with output polarizer is given by the product of three matrices:

$$\underline{M}_T = \begin{pmatrix} \cos\theta_p \sin\theta_p \\ 0 \quad 0 \end{pmatrix} \begin{pmatrix} e^{i\delta_2}\cos\theta_2 & e^{i\delta_2}\sin\theta_2 \\ -\sin\theta_2 & \cos\theta_2 \end{pmatrix} \begin{pmatrix} e^{i\delta_1}\cos\theta_1 & e^{i\delta_1}\sin\theta_1 \\ -\sin\theta_1 & \cos\theta_1 \end{pmatrix} \quad 13.$$

Thus, the output is given by:

14. $f(t) = e^{i(\phi_1+\phi_2)}\cos\theta_p\cos\theta_2\cos\theta_1 f_0(t-\tau_1-\tau_2)$
$-e^{i\phi_2}\cos\theta_p\sin\theta_2\sin\theta_1 f_0(t-\tau_2)$
$-e^{i\phi_1}\sin\theta_p\cos\theta_1\sin\theta_2 f_0(t-\tau_1)$
$-\sin\theta_p\cos\theta_2\sin\theta_1 f_0(t)$ If the width of the function $f_0(t)$ is smaller than the temporal delays, $\tau_1$ and $\tau_2$ such that no overlap exists as shown in FIG. 1a and FIG. 1b, then the output will consist of a distribution of pulses having the energies relative to the input pulse energy table below for the nondegenerate case.

| OUTPUT PULSE # | ENERGY ASSUMING INPUT OF ONE UNIT |
|---|---|
| 27a | $\sin^2\theta_p\cos^2\theta_2\sin^2\theta_1$ |
| 27b | $\sin^2\theta_p\cos^2\theta_1\sin^2\theta_2$ |
| 27c | $\cos^2\theta_p\sin^2\theta_2\sin^2\theta_1$ |
| 27d | $\cos^2\theta_p\cos^2\theta_2\cos^2\theta_1$ |

The total output energy including all pulses is just a sum of the above terms. In the degenerate case depicted in FIG. 1b the central output pulse 28b is formed by the complex addition of the amplitudes of the equivalent two central pulses of the nondegenerate case 27b and 27c. The resultant energy of this central pulse will be proportional to the square of the resultant amplitude. The table below gives the intensities of the three output pulses for this case.

| OUTPUT PULSE # | PULSE ENERGY ASSUMING UNIT INPUT ENERGY |
|---|---|
| 28a | $\sin^2\theta_p \sin^2\theta_1 \cos^2\theta_2$ |
| 28b | $\|e^{i\phi_2}\cos\theta_p \sin\theta_1 \sin\theta_2 \mp$ $e^{i\phi_1}\sin\theta_p \cos\theta_1 \sin\theta_2\|^2$ |
| 28c | $\cos^2\theta_p \cos^2\theta_1 \cos^2\theta_2$ |

Analysis of the properties of degenerate and nondegenerate systems reveals that an N stage nondegenerate system will produce $2^N$ output pulses for each input pulse and the energy distribution in the output will be controlled by only N + 1 angular variables. Thus, it is not possible to produce a completely arbitrary output distribution when N > 2. On the other hand, the N stage totally degenerate system can produce an arbitrary output distribution because the number of degrees of freedom equals the number of output pulse for each input pulse.

It should be clear to one skilled in the art that, as the temporal delay is made comparable with the input pulse width, the output pulses will overlap and produce a continuous distribution of output sensitivity which can be described in terms of a complex sum of amplitudes of the input functions. This situation is illustrated in FIG. 1c for the degenerate case.

Referring to FIG. 1c, it is seen that if the temporal delay is comparable to the pulse width of the incident radiation, the amplitudes in the region of overlap between pulses will add at the output polarizer of the shaper. In this figure, the three output pulses 30a, 30b, and 30c will combine to form a single pulse 31. In this case, it is assumed that the relative phase angles between pulses are zero so that simple addition can be used to determine the output amplitude. If this were not true, a vector addition in the usual manner of dealing with complex variables would have to be done to determine the amplitude and phase in the overlap region.

The term "birefringent element" used above is defined here to mean any single optical element or collection of elements acting to first project the input beam into two or more polarized states and then introduce a phase shift between said states. One embodiment of a birefringent element is shown in FIG. 2a. A uniaxial crystal 35, such as $KH_2PO_4$ or $LiNbO_3$, is oriented with its optic axis 36 perpendicular to the direction of propagation of the incident beam 37. In this configuration, the radiation field propagates with two allowed states of polarization, one perpendicular to the optic axis 36 and one parallel to the optic axis. The former is termed the ordinary ray and the latter the extraordinary ray. The two rays propagate collinearly and parallel to the axis of the beam 37 because of the angle between the wave vectors and the optic axis is 90 degrees. It is important to emphasize that this condition be maintained because, if the angle of propagation between the two rays and the optic axis is not 90 degrees, the ray vector for the two rays will not be in the same direction and the beams will separate due to double refraction. The phase shift introduced between the two rays is $\delta = (2\pi/\lambda)Bl$ where $B = n_e - n_o$ is the birefringence. The refractive index associated with the extraordinary ray is $n_e$ and $n_o$ is the refractive index associated with the ordinary ray. $\lambda$ is the free space center wavelength of the pulse of light. l is the total length of the path traveled through the crystal.

FIG. 2b shows an embodiment of a single birefringent element composed of a birefringent crystal 40 of length x surrounded by a system of two mirrors 42 and 43 the second mirror 43 having a dimension which allows the beam 45 to enter the crystal 40. An arrangement such as this permits long path lengths in order to achieve relatively larger temporal phase shifts and at the same time use crystal lengths, x, that are practically available. The plane of the drawing of FIG. 2b is the plane perpendicular to the optic axis of the crystal. This configuration is necessary in order to prevent separation of the ordinary and extraordinary components of the incident beam 45 as the beam propagates through the crystal. Here the beam is made to pass through the crystal four times. Thus, the total effective length is 4x and $\delta = (2\pi/\lambda)B4x$.

Figure 2C:
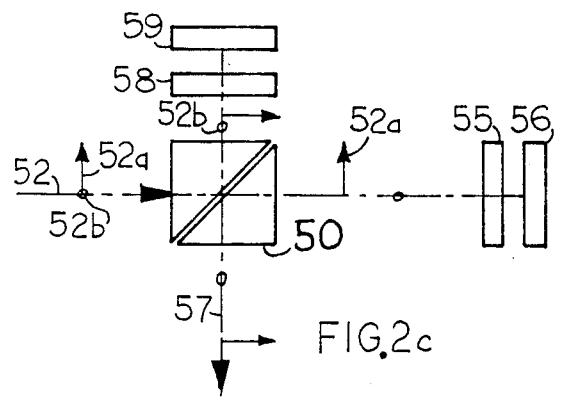
FIG. 2c shows an embodiment of a single birefringent stage consisting of a polarizing beam splitter interferometer with quarter waveplates.

Referring to FIG. 2c, another embodiment of the birefringent element is described in which a polarizing beam splitter 50 projects the incident beam 52 into two polarized states; one, 52a, is polarized parallel and the other, 52b, is polarized perpendicular to the plane of the drawing. The ray 52a is transmitted by the polarizing beam splitter 50 and is made to pass through the quarter wave plate 55 which is oriented with its optic axis so as to convert the plane polarized beam into a circularly polarized beam which then reflects from the mirror 56. The reflected beam then passes through the quarter wave plate 55, and is converted to a state of plane polarization perpendicular to the plane of the drawing. The reflected beam 52a then is reflected by the polarizing beam splitter 50 and becomes part of the output beam 57. The beam 52b is reflected by the polarizing beam splitter 50 towards the quarter wave plate 58 and the mirror 59. Its polarization state is converted in a manner like 52a and returns to the beam splitter 50 where it is recombined with 52a to become part of the output beam 57. Since the optical paths traveled by 52a and 52b can be adjusted by adjusting the relative spacing between the beam splitter 50 and the mirrors 56 and 59, an adjustable phase shift can be introduced between the two beams on passing through this birefringent element. The phase shift between the fast and slow beam is 15. $\delta = (2\Pi/\lambda)\Delta l$ where $\Delta l$ is the optical path length difference between the two paths through the birefringent element.

FIG. 3 shows a particular embodiment of the invention especially suited for use as a four stage degenerate pulse shaper utilizing birefringement stages of the type described in FIG. 2c. Each of the four stages utilizes a common beam splitter in the form of a cube 65, common quarter wave plates 70a and 70b, and common mirrors 75a and 75b. Optical coupling between the four stages is provided by two roof prisms 80a and 80b. Rotation of the plane of polarization between the four stages is provided by the optically active crystals 85a, 85b and 85c. Operating in the degenerate mode, this pulse shaper will produce five pulses at the output for each input pulse. The relative angular orientation of the orthogonal axis system of each successive stage is controlled by the optically active elements 85a, 85b and 85c. By selecting specific relative orientation angles, between the polarization basis vectors associated with each stage, any arbitrary distribution of output amplitudes can be achieved. To follow the beam path through the system, start at the input beam 90a which enters the upper left quadrant of the cube 65. This beam 90a is divided so that the orthogonal polarization components travel through the quarter wave plates 70a and 70b and reflect from mirrors 75a and 75b whereupon they travel again through the quarter wave plates and are recombined at the point of original division in the cube 65 into the single output beam 90b. The prism 80a couples the beam 90b to the lower part of the cube 65. Prior to entering the beam splitter of the second stage, the orthogonal polarization axes describing the radiation field of 90b are rotated by the optically active element 85a. The beam now enters the cube 65 and is projected into two orthogonal polarization states by the action of the beam splitter. These two states are propagated to mirrors 75a and 75b through quarter wave plates 70a and 70b, reflected by the mirrors and again transmitted through the quarter wave plates and recombined at the beam splitting surface of the cube 65. This output beam of the second stage 90c is coupled into the third stage through the rotator 85b by the roof prism 80b. This stage operates on the beam in a manner the same as the previous stages and projects its output 90d to the roof prism 80a where it is coupled to the fourth stage through rotator 85c. The output of this fourth stage 90e can then be made to pass through an exit polarizer 91 or into another sequence of stages in a more complex system, if desired. In some cases it is clear that no exit polarizer is needed if the specific application requires the use of a pulse structure consisting of a radiation field in both modes of polarization.

Figure 3A:
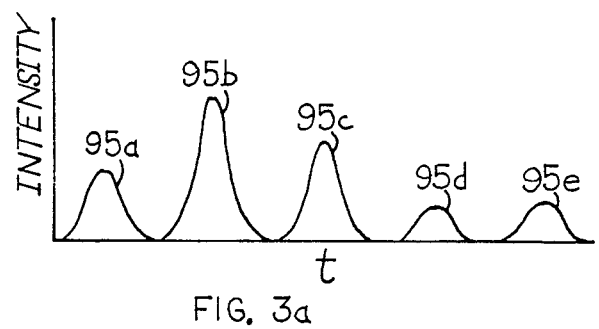
FIG. 3a shows an example of the output pulse distribution from the embodiment shown in FIG. 3.

The specific output distribution for any set of angles of rotation induced by the optically active elements can be calculated using the teachings described in the section on theory above. Anyone skilled in the art can compute the transfer function for the four stage pulse shaper by forming a $M_T$ matrix. This matrix then is made to operate on the state vector of the incident beam and generates the output state. In this case the output state (see FIG. 3a) will consist of five pulses 95a, 95b, 95c, 95d and 95e.

Figure 4:
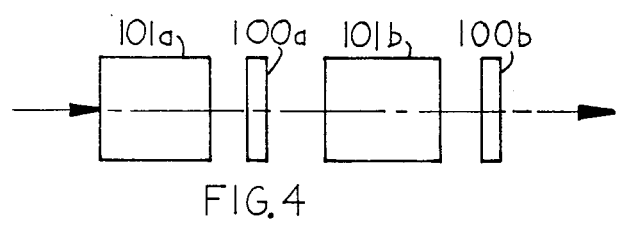
FIG. 4 shows an embodiment of the invention consisting of two birefringent stages with a polarizer between stages and an output polarizer.

FIG. 4 depicts another embodiment of the invention wherein output polarizers 100a and 100b are part of each stage 101a and 101b, repsectively. In this configuration some attenuation will occur at each polarizer. The output pulse amplitude distribution for this two stage nondegenerate case can be derived from the teachings of the section on theory above.

It will be clear to anyone skilled in the art that many series and parallel combinations of systems (each consisting of one or a plurality of birefringent stages) is possible. The output pulse distribution can always be determined from the teachings of the theory above with care exercised to account for temporal delays caused by optical path length differences in parallel elements of the system. The output distribution of each subsystem or element of a complex system can be determined from the input distribution of electromagnetic energy and the system transfer function as defined above.

Figure 5:
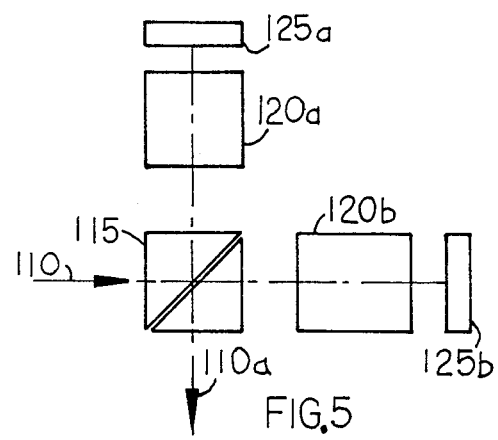
FIG. 5 shows a system composed of two pulse shaping systems coupled by a single polarizing beam splitter.

One further example of an embodiment including two systems operating in parallel (120a and 120b) and joined by a common beam splitting element 115, is shown in FIG. 5. In this embodiment the incident beam 110 is divided by the beam splitter 115 according to its state of polarization. One polarized component is propagated through the subsystem 120a to a mirror 125a, where it is reflectd back through 120a to the polarizing beam splitter 115. Only components polarized parallel to the plane of the drawing will be included in the output beam 110a from the element 120a. In a similar manner, the component of the incident beam 110, polarized parallel to the plane of the drawing will be transmitted through 120b, reflected at mirror 125b, again transmitted through 120b and the component of the resulting beam polarized perpendicular to the plane of the drawing transmitted to the output. The components not transmitted to the output will be reflected out the input port of the system. The components of the radiation field transmitted through each arm of the device will be combined in the output beam 110a with a phase shift caused by the optical path length difference $\Delta l$ of $\delta = 2(\pi/\lambda)\Delta l$.

It is to be understood that the above described embodiments are only illustrative of the application of the principles of the invention. In accordance with these principles, many other arrangements can be devised by those skilled in the art without departing from the spirit and scope of the invention. For example, various techniques can be employed for rotating the relative plane of polarization between stages, any birefringent crystal can be used in the embodiment described using birefringent crystals not just the two example crystals discussed.

I claim is:

1. A system for reshaping pulses of optical radiation comprising:
   first means for receiving a polarized pulse input from a source of optical radiation and projecting said pulse into two orthogonally polarized beams;
   second means for propagating said two beams together along a common axis of transmission;
   third means for introducing a phase shift of at least 2 $\pi$ radians between said two beams;
   fourth means for recombining said two beams into a common output; and wherein
   said output is reshaped with respect to said input pulse.

2. The system recited in claim 1 further comprising means for projecting said common output into a single polarization state.

3. The system recited in claim 2 wherein said first, second third and fourth means comprises a birefringent element 4. The system recited in claim 1 wherein said system comprises a pulrality of stages, each stage including at least said first, second, third and fourth means.

5. The system recited in claim 4 further comprising an optically active element between adjacent ones of said stages for rotating the plane of polarization of radiation between said stages.

6. The system recited in claim 3 wherein said birefringent element comprises a birefringent crystal.

7. The system recited in claim 6 further comprising means for redirecting said recombined output back through said birefringent crystal along a second path, whereby said recombined output is projected into two orthogonal polarized beams such that a further phase shift is introduced between said two beams of said recombined output during propagation along said second path.

8. The system recited in claim 7 further comprising a second birefringent crystal disposed along a common optic axis and in series with said first birefringent crystal for receiving an output therefrom.

9. The system recited in claim 6 wherein said second means comprises said birefringent crystal disposed such that the optic of said crystal is normal to said axis of transmission.

10. The system recited in claim 8 wherein the slow and fast axis of said second birefringent crystal are aligned with the slow and fast axis of said first birefringent crystal, said system further including an optically active element interposed between said two birefringent crystals for rotating the plane of polarization of radiation out of said first birefringent crystal.

11. A system for reshaping pulses of optical radiation comprising:

a polarizing beam splitter for receiving a polarized pulse input from a source of optical radiation and projecting said pulse into two orthogonally polarized beams, each beam being directed by said beam splitter along a different axis of transmission;

means for redirecting each said beam back into said beam splitter such that said two beams form a common output out of said beam splitter; and means rendering a different path length for one of said beams between said beam splitter and said redirecting means with respect to the path length of the other of said beams, whereby a phase shift is introduced between said two beams.

12. The system recited in claim 11 wherein said redirecting means comprises a mirror.

13. The system recited in claim 11 further comprising means interposed between said beam splitter and said redirecting means for converting each plane polarized beam incident thereto into a circular polarized beam.

14. The system recited in claim 13 wherein said converting means comprises a quarter-wave plate interposed between said redirecting means and said beam splitter.

15. The system recited in claim 13 wherein said means for converting each plane polarized beam incident thereto into a circular polarized beam and redirecting means comprises a quarter wave plate having deposited on one surface a highly reflecting film.

16. A system for significantly changing the temporal shape of each pulse in a pulse train of polarized electromagnetic radiation comprising a plurality of phase shifting stages, each stage including first means for projecting each said polarized pulse into a multiplicity of orthogonally polarized beams and second means for introducing an incremental phase shift between at least two of said polarized beams wherein the sum of said incremental phase shifts effects a change in the temporal shape of each said pulse; and means for recombining said beams into a common output.

17. The system recited in claim 16 wherein said first means comprises a single beam splitter common to all of said stages.

18. The system recited in claim 16 wherein said common beam splitter comprises a cube beam splitter.

19. A method for significantly changing the temporal shape of each pulse in a pulse train of polarized electromagnetic radiation, comprising the steps of:

receiving a polarized pulse input from a source of optical radiation and projecting said pulse into two orthogonally polarized beams;

propogating said two beams together along a common axis of transmission;

introducing a phase shift of at least $2\pi$ radians between said two beams; and recombining said two beams into a common output whereby said output is reshaped with respect to said input pulse.

20. A system for modulating pulses of optical radiation comprising first means for receiving a polarized pulse input from a source of optical radiation and rotating the plane of polarization of said pulse, second means for projecting said pulse into two orthogonally polarized beams, third means for propogating said two beams together along a common axis of transmission, fourth means for introducing a phase shift of at least $2\pi$ radians between said two beams, fifth means for combining said two beams into a common output and means for modulating said output pulse with respect to said input pulse.

21. The system recited in claim 20 wherein said means for rotating the plane of polarization of the input pulse comprises an optically active element.

22. The system recited in claim 21 wherein said means for rotating the plane of polarization of the input pulse comprises a Faraday rotator.